United States Patent [19]
Bubb et al.

[11] 4,449,339
[45] May 22, 1984

[54] SIDE-WALL DISCHARGE SYSTEM

[75] Inventors: Charles E. Bubb, Tulsa; Fred E. Mauch, Sapulpa, both of Okla.

[73] Assignee: Parkersburg Tank, Division of Maloney Crawford Corporation, Tulsa, Okla.

[21] Appl. No.: 308,619

[22] Filed: Oct. 5, 1981

[51] Int. Cl.³ .............................................. E04H 7/00
[52] U.S. Cl. .......................................... 52/195; 52/247
[58] Field of Search ................ 52/192, 193, 194, 196, 52/197, 245, 247, 195

[56] References Cited

U.S. PATENT DOCUMENTS

| | | | |
|---|---|---|---|
| 1,936,133 | 11/1933 | Kaatz | 52/192 |
| 2,361,272 | 10/1944 | Covey | 52/247 X |
| 2,907,501 | 10/1959 | Laird | 222/485 |
| 3,341,090 | 9/1967 | Reinbert | 222/464 |
| 3,380,147 | 4/1968 | McDonald | 52/247 X |
| 3,418,769 | 12/1968 | Kuck | 52/245 X |
| 4,030,633 | 6/1977 | Fisher | 222/1 |
| 4,109,827 | 8/1978 | Leonard, Jr. | 222/1 |
| 4,138,021 | 2/1979 | McKenzie | 214/17 C |

*Primary Examiner*—Carl D. Friedman
*Attorney, Agent, or Firm*—Head, Johnson & Stevenson

[57] ABSTRACT

A thin-walled deep grain storage tank with improved sidewall discharge system involving a plurality of successive flat plates periodically mounted to the inside of a pair of vertical, parallel I-beam and/or Z-bar sidewall support members with openings for grain flow between successive plates, and a sidewall discharge means at the base of the tank. In this manner an internal chute is formed capable of staged discharge from successive top strata of stored grain. Such a system is useful in alleviating the problems associated with the build up of excess eccentric sidewall pressure during grain discharge without significantly altering the design and construction parameters and their associated economics.

3 Claims, 5 Drawing Figures

SIDE-WALL DISCHARGE SYSTEM

BACKGROUND OF THE INVENTION

1. Field of the Invention

This invention relates to an apparatus for discharging particulate material from a storage tank. More specifically, it relates to a sidewall discharge system for tall thin-walled grain storage tanks.

2. Description of the Prior Art

In designing, engineering and constructing contemporary large, deep storage tanks a major economic incentive is placed on the efficient use of materials to maximize capacity within acceptable structural limits. Thus, the contemporary storage tank intended for storing granular free-flowing material frequently is a thin-walled structure with the roof supported directly on the foundation by use of vertical members. In such tanks, the load associated with the stored granular mass is intended to be distributed evenly downward toward the base and foundation of the tank.

It is known that when discharging grain or the like from a tall storage tank that a considerable amount of grain is set in motion. As long as the discharge is from the center of the tank the pattern of this movement is concentric with the tank. However, it is further recognized in the art that if grain is discharged from the side of the tank the pattern of movement becomes eccentric with the tank. The depth of the grain directly above the opening becomes significantly less than on the opposite wall of the tank creating a difference in sidewall pressure around the perimeter of the tank. This results in an eccentric distortion of the tank that conceivably could become severe enough to cause permanent distortion or even structural failure of the tank.

Up to the present time, when faced with such a problem the usual solution is to design sufficient hoop strength and rigidity into the tank to account for the development of the eccentric forces during discharge. It has also been proposed that a series of baffles and wear plates (generally of a frusto/rectangular/pyramidal shape) be periodically attached to the inside of the wall directly above the sidewall opening or that a vertical flume with periodically spaced openings and internal baffles be mounted on the interior of the wall directly above the opening. In this manner the upper portion of the tank will discharge in successive layers, thus alleviating the distortion problem. However, each of these proposals involves additional expense in material, fabrication, and construction and the cumulative economic effect is significant.

Various other methods and apparatus for discharging granular material from storage tanks have been suggested. For example, U.S. Pat. No. 3,341,090 proposes the use of concentric walls forming an annular space between the wall, with perforations in the inner wall and with both the annulus and the inner silo having concentric central outlets with a sloped bottom. The purpose of such a structure is to mix the granular material from different strata as the silo discharges. An apparatus of similar purpose but different structure was disclosed in U.S. Pat. No. 2,907,501 wherein proportional blending of particulate material from a stratified storage vessel was achieved during discharge by use of a centrally located chute with a plurality of entrances at various depths with each entrance being equipped with an outwardly extending deflecting means. In contrast to the above patents, U.S. Pat. No. 4,030,633 discloses a sloped bottom hopper equipped with a plurality of material discharge spouts distributed such that laminar mass flow is achieved during discharge. In other words, the objective of the device is to have substantially first in-first out storage.

In U.S. Pat. No. 4,109,827 a centrally located discharge column, with a series of discharge openings is mounted within a hopper in order to create a choked flow discharge path for the express purpose of minimizing vibration and impact, while in U.S. Pat. No. 4,138,021 a centrally located vertical structure is disclosed which is useful in both loading and unloading of the storage receptacle resulting in uniform sidewall forces.

SUMMARY OF THE INVENTION

In view of the problems associated with eccentric sidewall loading during discharge of granular material from a storage tank employing a sidewall discharge or the so-called side draw-off system (SDOS) we have discovered an improved SDOS that is economically attractive from the structural design, capital investment, and installation viewpoints. Thus, the present invention provides, in a storage tank for particulate material having exterior sidewalls attached to the interior vertical structural members that directly support the roof, the specific improvement comprising:

(a) at least two of the support members being adjacent and essentially parallel from the foundation to the top of the storage tank;

(b) a sidewall discharge means located between the adjacent support members through which stored particulate material is withdrawn; and (c) a plurality of essentially vertical flat surfaces periodically mounted along the inside of the pair of adjacent vertical support members leaving openings between successive surfaces thereby forming an interior chute with a plurality of openings in communication with the discharge means that allows selective flow of the stored particulate material during discharge, from successive top strata.

In one specific embodiment, the present invention provides that the adjacent vertical support members are about two feet apart and about six inches wide and the essentially flat vertical surfaces are about three feet long with from about six to twelve inch openings between successive surfaces. It is further provided in a preferred embodiment that the lower portion of the adjacent vertical structural members are I-beams up to an intermediate level within the tank and are Z-bar beams of slightly smaller dimension from the intermediate level to the top of the tank.

It is an object of the present invention to provide a sidewall discharge system for granular or particulate material storage, that alleviates the problems associated with eccentric sidewall pressure build-up during discharge. It is an associated object that the SDOS be economical, particularly that its presence does not alter the basic design, engineering and construction parameters of the tank. Fulfillment of these objects and the presence and fulfillment of other objects will be apparent upon the reading of the complete specification and claims taken in conjunction with the attached drawings.

DESCRIPTION OF THE PREFERRED EMBODIMENT

Figure 1:
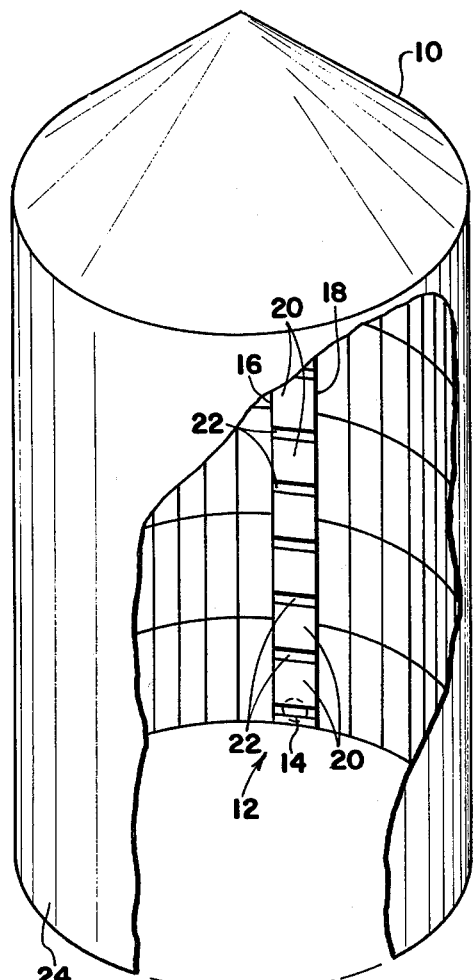
FIG. 1 is a cross-sectional view of a storage tank containing the discharge apparatus according to the present invention.

The sidewall discharge system of the present invention, how it functions, and how it is incorporated into a contemporary thin-wall tall storage tank can perhaps be best explained and understood by reference to the drawings. FIG. 1 illustrates a cross-sectional view of such a storage tank 10 equipped with the sidewall discharge apparatus of the present invention generally designated by the numeral 12. Discharge port 14 is located at a customer specified location of storage tank 10 between two vertical support members 16 and 18. The vertical support members 16 and 18 extend upward from the foundation of storage tank 10 essentially parallel, terminating at the top of the tank 10. Attached to the interior of the vertical support members 16 and 18 are a series of flat surfaces 20, each sequentially spaced relative to the next flat surface 20 such as to create an opening 22 between each flat surface. In this manner a vertical chute or conduit is created involving the exterior surface 24 of tank 10, the two essentially vertical parallel support members 16 and 18, and the series of flat surfaces 20.

Figure 2:
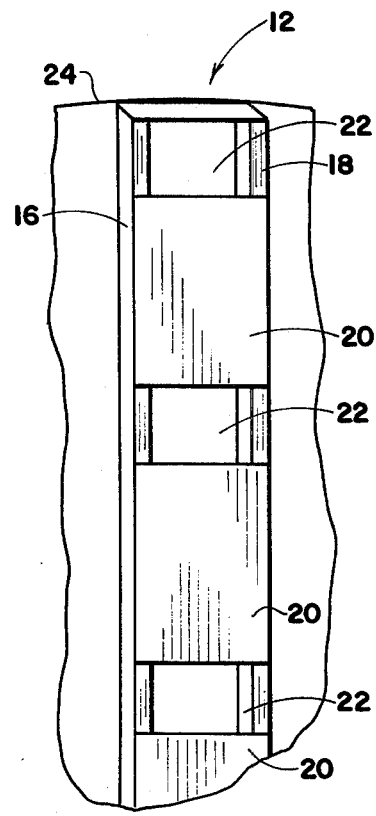
FIG. 2 illustrates the discharge apparatus of FIG. 1.
Figure 3:
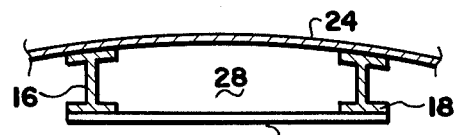
FIG. 3 is a top cross-sectional view of the discharge apparatus employing I-beam vertical support members.
Figure 4:
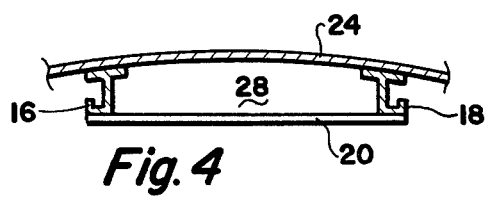
FIG. 4 is a top cross-sectional view of the discharge apparatus employing modified Z-bar vertical support members.
Figure 5:
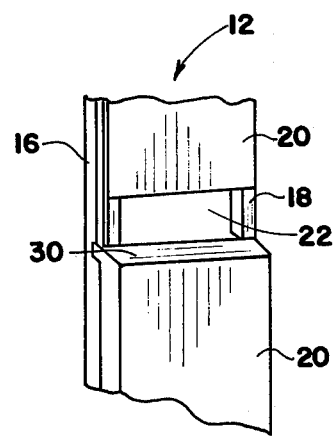
FIG. 5 is an isometric view of the transition from I-beam to modified Z-bar vertical support members.

FIG. 2 is a close-up view of the discharge apparatus 12 of FIG. 1 showing a portion of the exterior wall 24, the two vertical support members 16 and 18 and a series of three consecutive flat surfaces 20 separated by openings 22. FIG. 3 illustrates a top cross-sectional view of the lower portion of the discharge apparatus 12 of FIG. 1 wherein the vertical support members 16 and 18 have an I-beam cross-section. As illustrated, the chute is made up on two sides by I-beam members 16 and 18 and by flat surfaces 20 and exterior wall 24 on the other two sides, thus producing an interior conduit 28 capable of delivering stored particulate material such as grain or the like, from the top of the storage tank downward to the discharge port 14. Similarly FIG. 4 illustrates a top cross-sectional view of the upper portion of the discharge apparatus 12 of FIG. 1 wherein the vertical support members 16 and 18 have a modified Z-bar structure. FIG. 5 illustrates the transition from the lower I-beam cross-sectioned vertical support members to the Z-bar cross-sectioned vertical support members occurring part way up tank 12. As illustrated, the point of transition involves a horizontal plate 30 to account for any reduction in size of the upper Z-bar vertical support member relative to the lower I-beam vertical support member.

In operation, the discharging particulate material will selectively enter the uppermost opening 20 falling vertically downward through the chute to the discharge port 14. As such, at any given time, the angle of inclination of the stored particulate material; i.e., the slope of the top of the stored grain, will tend to remain flat, minimizing the difference in height across the storage tank 12. Consequently the pressure difference experienced at the sidewall will also be minimized resulting in essentially no induced eccentricity of the tank 12.

Having thus described the preferred embodiments for the invention with a certain degree of particularity, it is manifest that many changes can be made in the details in the construction and the arrangement of the components without departing from the spirit and scope of this disclosure. Therefore, it is to be understood that the invention is not limited to the embodiment set forth herein for purposes of exemplification, but is to be limited only by the scope of the attached claims including a full range of the equivalents to which each element thereof is entitled.

What is claimed is:

1. In a storage tank for particulate material having exterior sidewalls resting on a foundation and attached to interior vertical structural members that directly support the roof, the specific improvement comprising:
    (a) at least two of said support members being adjacent and essentially parallel from the foundation to the top of said storage tank sidewall;
    (b) a sidewall discharge means located between said adjacent support members through which stored particulate material is withdrawn; and
    (c) a plurality of essentially vertical flat surfaces periodically mounted along the inside of said pair of adjacent vertical support members leaving openings between successive surfaces wherein said support members, sidewall and vertical flat surfaces form an interior chute with a plurality of openings in communication with said discharge means that allows selected flow of said stored particulate material during discharge, from successive top strata.

2. A storage tank of claim 1 wherein said adjacent vertical support members are about 2 feet apart and about six inches wide and said essentially flat vertical surfaces are about 3 feet long with from about 6 to 12 inch openings between successive surfaces.

3. A storage tank of claim 1 or 2 wherein the lower portion of said adjacent vertical structure members are I-beams up to an intermediate level within the tank and are Z-bar beams of slightly smaller dimension from said intermediate level to the top of said tank.

* * * * *